July 5, 1966  W. C. STEINMETZ  3,259,227
ADJUSTABLE TROUGHING IDLER
Filed Nov. 4, 1963  2 Sheets-Sheet 2
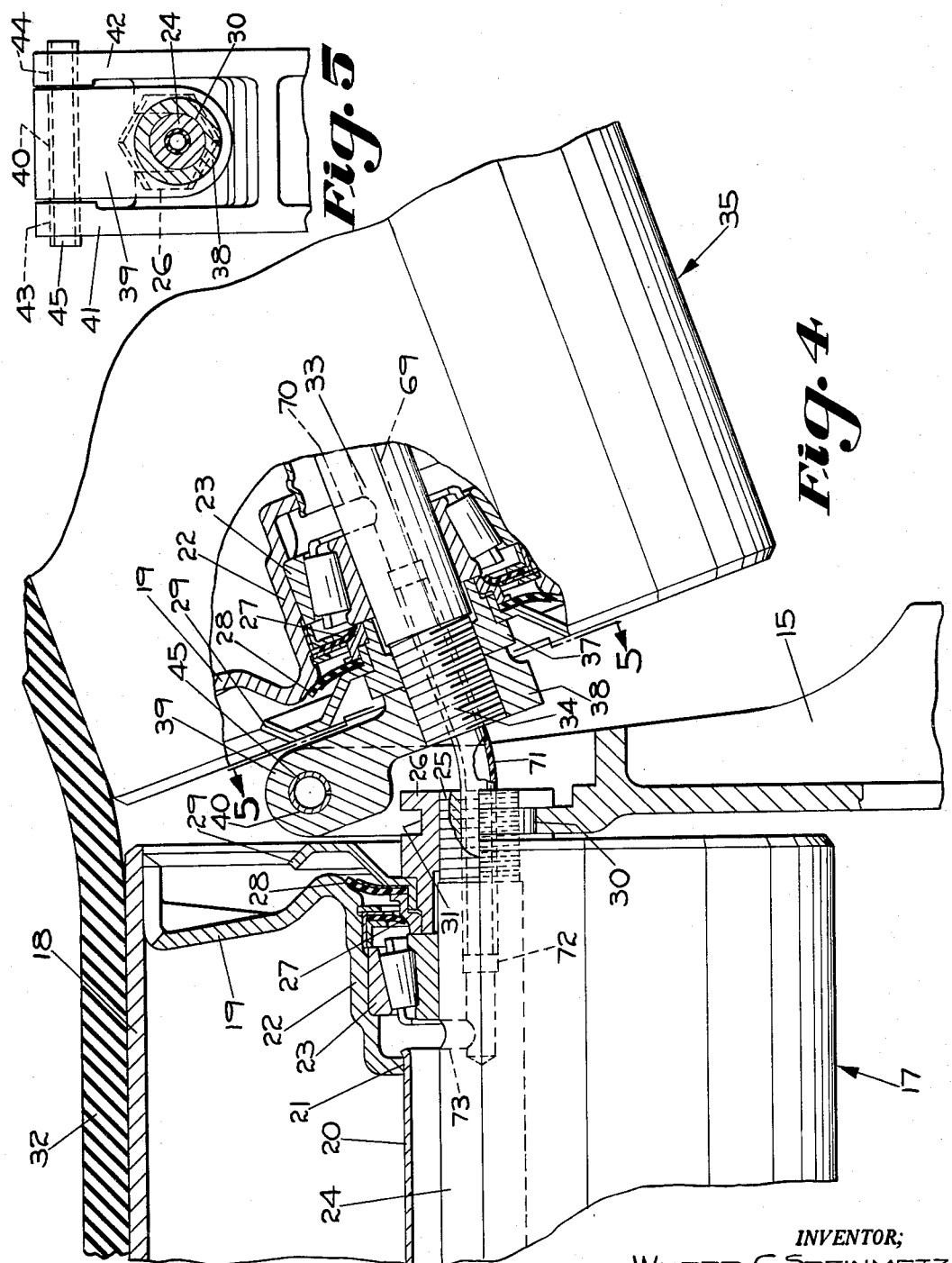
INVENTOR;
WALTER C. STEINMETZ
BY David Young
ATT'Y.

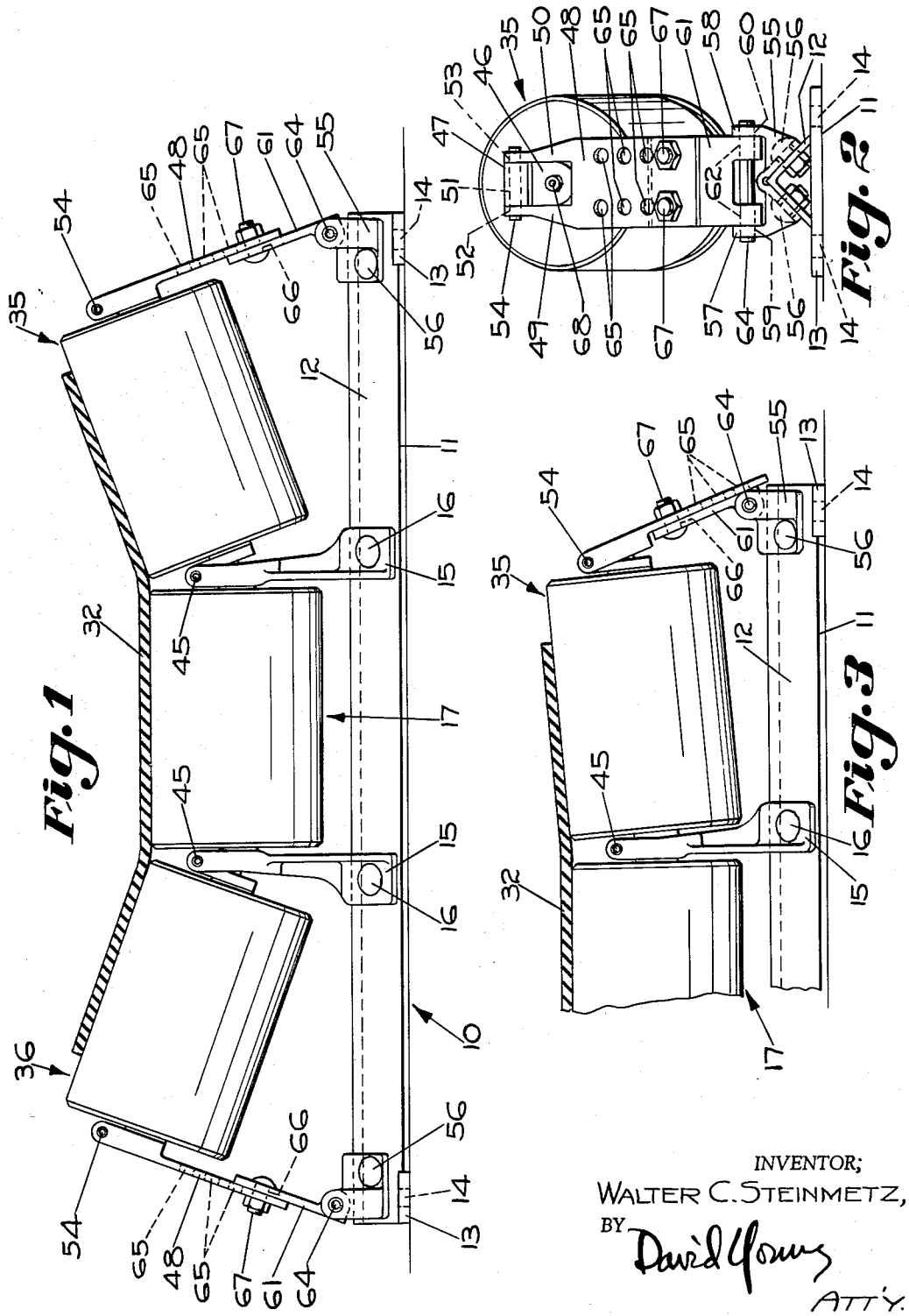

3,259,227
Patented July 5, 1966

1

3,259,227
ADJUSTABLE TROUGHING IDLER
Walter C. Steinmetz, Columbus, Ohio, assignor to Jeffrey Galion Manufacturing Company, a corporation of Ohio
Filed Nov. 4, 1963, Ser. No. 321,044
6 Claims. (Cl. 198—192)

The instant invention relates to troughing idlers for belt conveyors, and more particularly, to an improved construction for transition idlers.

In a belt conveyor in which the disposition of the belt is changed from straight to troughed in the course of the belt run, it is customary to utilize transition idlers for effecting the change of the belt; likewise, such transition idlers are used in changing the disposition of the belt from troughed to straight. An example of the utilization of the transition idlers is at the ends of the belt conveyor, at which the belt conveyor passes over substantially cylindrical end pulleys. As the belt comes over a pulley into the conveying run, the disposition of the belt is changed from straight to troughed; similarly, as the conveyor belt moves from the conveying run over the end pulley, the disposition of the belt is changed from troughed to straight.

It is an object of the instant invention to provide an improved transition idler of a simplified construction, which may easily be adjusted to provide the desired degree of troughing of the conveyor belt which is supported by the idler.

Other objects of the invention will appear hereinafter, the novel features and combinations being set forth in the appended claims.

In the drawings:

FIG. 1 is an elevational view of a transition idler constructed in accordance with the instant invention;

FIG. 2 is an end elevational view of the transition idler illustrated in FIG. 1;

FIG. 3 is a partial elevational view of the transition idler, illustrating another position thereof;

FIG. 4 is an enlarged view of the adjacent ends of idler rolls, illustrating details thereof; and FIG. 5 is a partial sectional view taken on the line 5—5 in FIG. 4.

Referring to the drawings, particularly FIGS. 1 and 2, there is illustrated therein a transition idler assembly 10 constructed in accordance with the instant invention. Such idler assembly includes a base 11, which may be formed of an ordinary structural angle 12, the legs of which are disposed in depending position. At each end of the angle 12 there is secured a foot 13 formed with a pair of apertures 14 for the reception of bolts, or like securing means, by which the idler assembly 10 may be secured to the framework of a conveyor, of which such idler assembly 10 is a part. The feet 13, 13 may be secured to the angle 12 by welding.

A pair of upright posts 15, 15 are disposed on the base 11. Each post 15 is secured to the angle 12 by a pair of bolts 16, or other suitable securing means. The posts 15, 16 are placed inwardly from the opposite ends of the base 11, and are spaced from each other to receive a center idler roll 17 therebetween. The idler roll 17 is disposed on a substantially horizontal axis and is supported by the posts 15, 15.

Referring to FIG. 4, the center idler roll is illustrated therein in greater detail. The center idler roll 17 comprises a cylindrical outer shell 18. In each end of the cylindrical outer shell 18 there is secured an end cap 19, which is press fitted and welded. A cylindrical tube 20 extends in an axial direction through the center idler roll 17 and has its end disposed in the center aperture 21 of the end cap 19. The cylindrical tube 20 is secured to the end cap 19 by crimping the tube 20 against the aperture 21. The end cap 19 has a hub 22 in which there is placed a suitable roller bearing 23, by which the cylindrical outer shell 18 of the center idler roll 17 is rotatably mounted on the axle 24, which extends axially through the idler roll 17 and through the inner race of the roller bearing 23. The axle 24 is formed with a threaded end 25, on which there is turned a nut 26. The nut 26 secures the bearing 23 is assembly in the hub 22 and on the shaft 24. There are also provided suitable sealing elements 27, 28 between the hub 22 and the shaft 24 to prevent dirt, dust and other foreign materials from getting into the bearing 23. A circular baffle 29 provides further protection for the bearing 23.

The post 15 has a U-shaped seat 30 which receives the nut 26 in supporting engagement, the nut 26 being formed with a circular neck 31 whereby the nut 26 is effectively engaged with the post 15 in the seat 30 thereof.

It will be understood that the opposite ends of the center idler roll 17 are the same, except that they are reversed with respect to each other. Thus, the center idler roll 17 is fixedly supported on the spaced upright posts 15, and the cylindrical outer shell 18 thereof is rotatable to move at the same speed as the conveyor belt 32, which is supported by such idler roll 17.

At one side of the center idler roll 17 there is a troughing idler roll 35, and at the other side thereof there is a like troughing idler roll 36. The troughing idler rolls 35, 36 are alike in all respects, and likewise, the supporting and adjusting structures therefor are alike, except that they are oppositely disposed, as seen in FIG. 1. Accordingly, the description will proceed with respect to the troughing idler roll 35, it being understood that the description is also applicable to the troughing idler roll 36.

Referring to FIG. 4, the troughing idler roll 35 is illustrated therein in greater detail. The construction of the troughing idler roll 35 is essentially the same as the construction of the center idler roll 17; to the extent that such construction is the same, the same refererence numerals are used in FIG. 4 in respect to the elements of the troughing idler roll 35. The following description of the troughing idler roll 35 is limited to the elements thereof which are different from the elements of the center idler roll 17.

In the troughing idler roll 35 a nut 37 is turned on the threaded end 34 of the shaft 33. The nut 37 in the troughing idler roll 35 replaces the corresponding nut 26 in the center idler roll 17. A bracket 38 is turned on the threaded end 34 of the shaft 33, and such bracket 38 is disposed substantially beyond the end of the troughing idler roll 35. The bracket 38 has an arm 39 which extends upwardly from the axis of the shaft 33. The arm 39 has a lateral aperture 40. The post 15 has a bifurcated upper end comprising spaced legs 41, 42, between which the arm 39 is disposed. The legs 41, 42 have apertures 43, 44, respectively, which are aligned with the aperture 40 of the arm 39. A roll pin 45 extends through the apertures 40, 43, 44, whereby the bracket 38 is secured to the post 15. The roll pin 45 is a pivot forming a pivotal connection of the bracket 38 to the post 15, whereby the angular disposition of the troughing idler roll 35 may be varied by swinging the latter upwardly or downwardly about the axis of the roll pin 45.

The outer end of the troughing idler roll 35 is constructed in the same manner as the inner end thereof as described above and as illustrated in FIG. 4. The outer end of the troughing idler roll 35 has a bracket 46 secured thereto on the threaded end 34 of the shaft 33. The bracket 46 is the same, in all respects, as the bracket 38. The bracket 46 has an arm 47 extending upwardly from the axis of the shaft 33.

A depending leg 48 has opposite legs 49, 50 which form the bifurcated upper end of the depending leg 48. The bracket 46 is disposed in the bifurcated upper end of the depending leg 48 between the opposite legs 49, 50. The arm 47 of the bracket 46 has a lateral aperture 51 that is aligned with apertures 52, 53 formed in the legs 49, 50, respectively. A roll pin 54 extends through the apertures 51, 52, 53, thereby securing the depending leg 48 to the bracket 46. The roll pin 54 forms a pivotal connection of the depending leg 48 to the bracket 46.

A short post 55 is secured to the end of the base 11. The post 55 is seated on the angle 12 and is secured thereto by a plurality of bolts 56, or other suitable securing means. The upper end of the post 55 is bifurcated with spaced legs 57, 58 that have apertures 59, 60, respectively. An upstanding leg 61 is disposed between the legs 57, 58, and has a pair of lateral apertures 62 that are aligned with the apertures 59, 60. A roll pin 64 extends through the apertures 59, 60, 62, thereby securing the upstanding leg 61 to the post 55. The roll pin 64 is a pivot that pivotally connects the upstanding leg 61 to the post 55.

The depending leg 48 has four pairs of spaced apertures 65. The upstanding leg 61 has one pair of spaced apertures 66. The apertures 66 may be aligned with any one of the four pairs of apertures 65, and when so aligned the depending leg 48 may be secured to the upstanding leg 61 by a pair of bolts 67, or other suitable securing means. By selection of the pair of apertures 65, the height of the outer end of the troughing idler roll 35 is determined, which in turn determines the angle of inclination of the troughing idler roll 35.

It is customary in a fully troughed idler that the troughing idler rolls are disposed at an angle of 20°. In a straight idler the angles of the rolls are 0°. The transition idler assembly 10 constructed in accordance with this invention, provides four steps of adjustment from 5° to 20°. Such steps of adjustment are each in the amount of 5°, as determined by the pair of apertures 65 that is utilized in securing the depending leg 48 to the upstanding leg 61. In FIG. 1, the transition idler assembly 10 is illustrated with the troughing idler rolls 35, 36 in their highest positions of adjustment, in which they are disposed at angles of 20°. In FIG. 3, the troughing idler roll 35 is illustrated in its lowest position of adjustment, in which its angle is 5°. Thus, when the conveyor belt 32 travels from its fully troughed disposition to a straight disposition, it moves through four steps of transition, and likewise, when the belt 32 moves from a straight disposition to fully trough disposition.

In the troughing idler roll 35, the outer end of the shaft 33 has a grease fitting 68 for lubrication of the idler assembly 10, and particularly the bearings 23. The lubricant is delivered through the axial bore 69 and radial bores 70 to the bearings 23 in the idler roll 35. One end of a flexible tube 71 is inserted in the axial bore 69 at the inner end of the axle 33. The other end of the flexible tube 71 is inserted in the axial bore 72 that is formed in the adjacent end of the shaft 24 of the center idler roll 17. The lubricant is delivered through the flexible tube 71 to the axial bore 72, and thence through the radial bore 73 to the bearing 23 in the center idler roll 17. Thus, the bearings 23 in the one end of the center idler roll 17, and in both ends of the troughing idler roll 35 may be lubricated from the one grease fitting 68 at the outer end of the troughing idler roll 35. The sealing elements 27, 28 serve to retain the lubricant in the bearings 23.

The flexible tube 71 is preferably formed of a plastic material that is not affected in any way by the lubricant. Since the tube 71 is flexible, it will bend to conform to the adjusted angular disposition of the troughing idler roll 35 and maintain communication between the axial bores 69, 72. Also, the tube 71 is slidable in the axial bores 69, 72 so that it can adjust its position in an axial direction in conformity to the adjusted position of the troughing idler roll 35, thereby preventing damage to the tube 71.

The transition idler assembly 10 constructed in accordance with this invention is set merely by securing the bolts 67 in the selected pairs of apertures 65. As described herein, the transition idler assembly 10 comprises a minimum number of elements which provide a simple idler construction that is readily adjusted.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. In an idler assembly having an idler roll disposed on an inclined axis, a base for said idler assembly, an upstanding support on said base, a bracket for supporting one end of the idler roll on said upstanding support, a roll pin securing said bracket to said upstanding support and forming a pivotal connection to pivotally mount said bracket on said upstanding support to permit the inclination of said idler roll axis to be varied, a depending leg at the other end of the idler roll, a roll pin securing said depending leg to said other end of the idler roll and forming a pivotal connection of the depending leg to the idler roll, a second support on said base for said other end of the idler roll, an upstanding leg adapted to be secured to the depending leg, a roll pin securing said upstanding leg to said second support and forming a pivotal connection of the upstanding leg to said second support, and means for securing said depending leg to the upstanding leg at a selected one of several positions to thereby selectively set the inclination of the axis of the idler roll.

2. In an idler assembly having an idler roll disposed on an inclined axis, a bracket for supporting one end of the idler roll, pivot means for pivotally mounting said bracket to permit the inclination of said idler roll axis to be varied, a second bracket like the first said bracket for supporting the other end of the idler roll, and means adjustable upwardly and downwardly and pivotally connected to said second bracket to selectively adjust the position of said other end of the idler roll to thereby selectively set the inclination of the axis of said idler roll.

3. In an idler assembly having an idler roll disposed on an inclined axis, said idler roll comprising a shaft disposed on said axis, bearing means disposed between said shaft and the roll for rotation of the roll about said shaft, a bracket secured to one end of the shaft for supporting one end of the idler roll, pivot means for pivotally mounting said bracket to permit the inclination of said idler roll axis to be varied, a second bracket like the first said bracket secured to the other end of said shaft for supporting said other end of the idler roll, and means adjustable upwardly and downwardly and pivotally connected to said second bracket to selectively adjust the position of said other end of the idler roll to thereby selectively set the inclination of the axis of said idler roll.

4. In an idler assembly having an idler roll disposed on an inclined axis, a bracket for supporting one end of the idler roll, an upstanding support for mounting said bracket, said upstanding support being bifuracted to receive the bracket, a roll pin extending through the upstanding support and the bracket to pivotally connect the bracket to the upstanding support to permit the inclination of said idler roll axis to be varied, a second bracket like the first said bracket for supporting the other end of the idler roll, a depending leg at the other end of said idler roll, said depending leg being bifurcated to receive said second bracket, a roll pin extending through the depending leg and the second bracket to pivotally connect the second bracket to the depending leg, and means for securing said depending leg at a selected one of several positions to thereby selectively set the inclination of the axis of the idler roll.

5. In an idler assembly, a first idler roll disposed on a substantially horizontal axis, a second idler roll disposed on an inclined axis, means for supporting said second idler roll with an end thereof adjacent an end of the first idler roll, said supporting means including means for angularly adjusting the position of said second idler roll to permit the inclination of the second idler roll axis to be varied, each of said first and second idler rolls including an axially disposed shaft having an axial bore through which lubricant is distributed, said shafts having adjacent ends at the adjacent ends of said first and second idler rolls, said axial bores extending to the adjacent shaft ends, a flexible tube connecting the first and second idler rolls for distribution of lubricant through the tube between said first and second idler rolls, and said flexible tube extending between the axial bores at the adjacent shaft ends and being slidable relatively to the axial bores and bending to conform to the inclined disposition of said second idler roll relative to said first idler roll.

6. In an idler assembly, a first idler roll disposed on a substantially horizontal axis, a second idler roll disposed on an inclined axis, means for supporting said second idler roll with an end thereof adjacent an end of the first idler roll, said supporting means including means for angularly adjusting the position of said second idler roll to permit the inclination of the second idler roll axis to be varied, each of said first and second idler rolls including an axially disposed shaft having an axial bore through which lubricant is distributed, said shafts having adjacent ends at the adjacent ends of said first and second idler rolls, said axial bores extending to the adjacent shaft ends, a flexible tube connecting the first and second idler rolls for distribution of lubricant through the tube between said first and second idler rolls, and said flexible tube being disposed in the axial bores of said adjacent shaft ends and extending between said adjacent shaft ends and being slidable in said axial bores to conform the axial disposition of the flexible tube to the inclined disposition of said second idler roll relative to said first idler roll.

References Cited by the Examiner

UNITED STATES PATENTS

| | | | |
|---|---|---|---|
| 809,227 | 1/1906 | Steckel | 198—192 |
| 1,208,883 | 12/1916 | Zieber | 198—192 |
| 2,427,590 | 9/1947 | Conners | 198—192 |
| 2,580,704 | 1/1952 | Schlagel | 248—284 |
| 2,757,988 | 8/1956 | Lecourbe | 198—192 XR |
| 2,843,432 | 7/1958 | Kindig | 198—192 XR |
| 3,089,580 | 5/1963 | Dilgard | 198—192 |

EVON C. BLUNK, *Primary Examiner.*

SAMUEL F. COLEMAN, *Examiner.*

R. E. KRISHER, *Assistant Examiner.*